United States Patent
Drader et al.

(10) Patent No.: US 7,633,234 B2
(45) Date of Patent: Dec. 15, 2009

(54) METHOD AND APPARATUS FOR MAXIMIZING THE SUSTAINABLE FLASH OF A HANDHELD PORTABLE ELECTRONIC DEVICE

(75) Inventors: Marc Drader, Kitchener (CA); Ryan Geris, Kitchener (CA); Lyall Winger, Waterloo (CA)

(73) Assignee: Research In Motion Limited, Ontario (CA)

( * ) Notice: Subject to any disclaimer, the term of this patent is extended or adjusted under 35 U.S.C. 154(b) by 513 days.

(21) Appl. No.: 11/620,755

(22) Filed: Jan. 8, 2007

(65) Prior Publication Data

US 2008/0164847 A1 Jul. 10, 2008

(51) Int. Cl.
*H05B 37/00* (2006.01)
(52) U.S. Cl. .............................. 315/200 A; 315/241 P
(58) Field of Classification Search ............... 315/242, 315/241 S, 244, 245, 360, 169.3, 241 P, 200 A
See application file for complete search history.

(56) References Cited

U.S. PATENT DOCUMENTS

| 5,352,968 | A | 10/1994 | Reni et al. |
| 2002/0047626 | A1* | 4/2002 | Odaka et al. ............... 315/291 |
| 2002/0171372 | A1* | 11/2002 | Motomura et al. ...... 315/200 A |
| 2004/0117137 | A1 | 6/2004 | Jin et al. |

FOREIGN PATENT DOCUMENTS

JP    2000 047307 A    2/2000

* cited by examiner

*Primary Examiner*—David Hung Vu
(74) *Attorney, Agent, or Firm*—Eckert Seamans Cherin & Mellott, LLC; Philip E. Levy, Esq.

(57) ABSTRACT

A method and apparatus for maintaining a maximum sustained flash current over the whole length of a flash using a programmable current drive in a handheld portable device powered by a battery. The method involves measuring the battery voltage before and after a flash is initiated and calculating the equivalent series resistance (ESR) of the battery. The calculated ESR is then used to adjust the flash current. The process may be repeated to correct for errors in the flash current.

20 Claims, 3 Drawing Sheets

METHOD AND APPARATUS FOR MAXIMIZING THE SUSTAINABLE FLASH OF A HANDHELD PORTABLE ELECTRONIC DEVICE

BACKGROUND

1. Field

This method and device relate generally to handheld electronic devices having a camera LED flash and more particularly, to such devices that employ a battery to power the LED flash in addition to other functions performed by the handheld electronic device.

2. Background

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are small and battery powered. While some handheld electronic devices include a wireless communication capability, other handheld electronic devices are standalone devices that do not communicate with other devices.

The capabilities of these handheld electronic devices continue to expand. For example, a camera capability has been added to many mobile phones and is likely to expand to other such handheld electronic devices. More recently, an LED camera flash capability has been added to a number of mobile phones that, along with the other mobile phone capabilities, is powered by a single lithium ion battery. The current drawn from operating an LED (light emitting diode) camera flash is enormous and can easily brown out the system under certain conditions. Brown out is also known as battery droop and means that the battery voltage drops to a level that can impair the operation of other system functions, possibly even causing the system to reset. A lithium ion battery's ability to maintain its voltage is dependent upon such factors as the age of the battery and temperature; i.e., the equivalent series of resistance (ESR) of the battery varies with these parameters. There are also other system loads, such as GSM (global system for mobile communications) transmits and WIFI TX or RX, that will affect the level at which the system browns out or resets completely. WIFI and GSM are mentioned herein as examples of communication regimes that may be employed by the handheld electronic device that will place a load on the system and are not intended to be limiting. For example, the device could alternatively employ CDMA (Code-Division Multiple Access) or UMTS (Universal Mobile Telecommunications System).

Since most of the factors that affect brown out are not generally known to the user at the time of system operation, e.g., age of the battery, current temperature, size of the system load and flash load, the worst case voltage drop must be assumed when a decision is made whether to activate the flash, if brown out is to be avoided. Assuming the worst case severely limits the usefulness of the flash; i.e., the flash won't trigger sometimes, even though the system could probably sustain a flash pulse. Therefore, a method and apparatus is desired that can more accurately estimate the maximum flash current that is sustainable without having to use worst case assumptions.

BRIEF DESCRIPTION OF THE DRAWINGS

A further understanding of the method and device disclosed herein can be gained from the following description of the preferred embodiments when read in conjunction with the accompanying drawings in which.

DESCRIPTION OF THE PREFERRED EMBODIMENT

Figure 1:
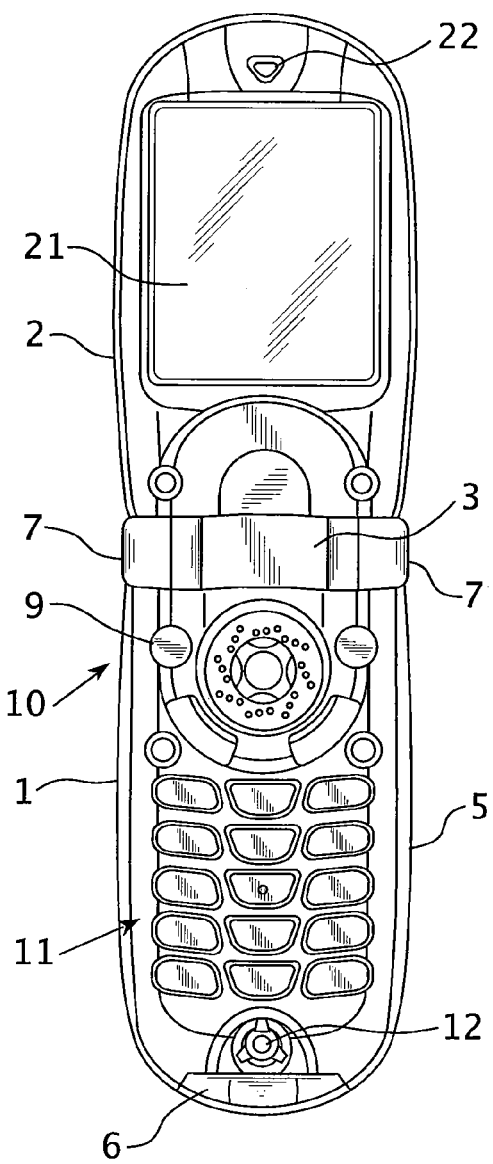
FIG. 1 is an elevational view of a foldable cell phone in the open position, viewed from the keypad side, for which the present concept may be applied.
Figure 2:
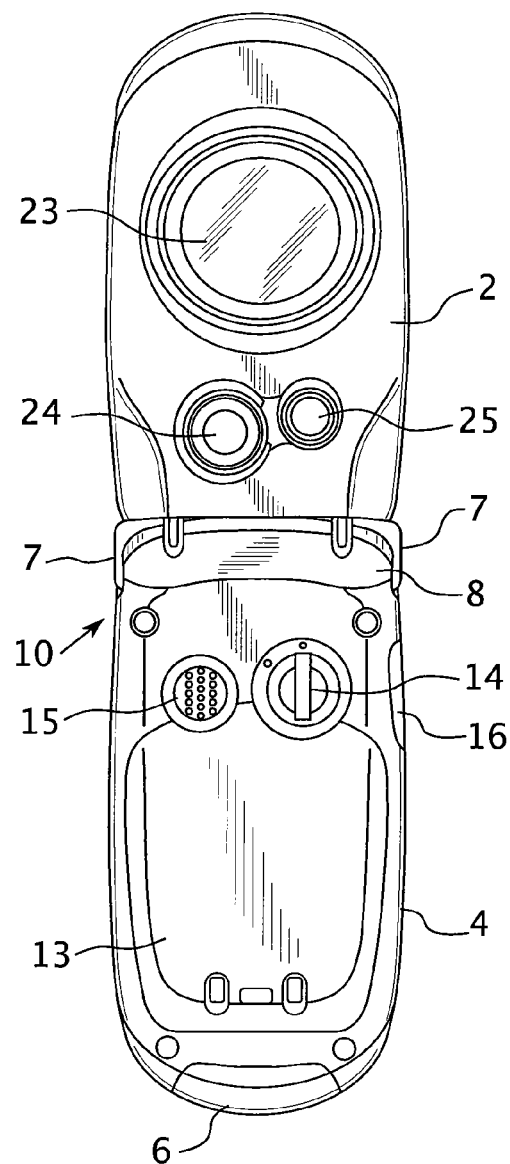
FIG. 2 is a elevational view of the open cell phone of FIG. 1, viewed from the reverse side.

The method described herein for maintaining a maximum sustainable flash current over the whole length of an LED flash using a programmable current drive can be applied to any handheld portable electronic device having an LED flash, usually in connection with a camera. For convenience, the method of this embodiment will be described as applied to a flash 25 of the cellular phone 10 illustrated in FIGS. 1 and 2. FIG. 1 shows an elevational view of the cellular phone 10 in the open position with the keypad in the operation section 11 and the main display screen 21 exposed. FIG. 2 is an elevational view of the reverse side of the open flip phone 10 shown in FIG. 1. The cellular phone 10 has a lower housing 1 comprising an operation section 11 having standard numerical and alphabetic keys and microphone 12 on the front side illustrated in FIG. 1 and a battery 13, a battery lock knob 14, a speaker 15 and an earphone cover 16 on the reverse side of the lower housing 1. An upper housing 2 comprises a main display section 21 and a receiver 22 on the front side and a subdisplay section 23, a camera lens section 24 and an LED flash section 25 on the reverse side of the upper housing 2. The cellular phone 10 further includes a hinge 3, a lower cover 4, an electrical connector cover 6, a hinge cover 7, an antenna cover 8 and a subdisplay 23 perimeter frame.

In accordance with this embodiment, when the user presses the camera shutter button 9 under low light conditions, a flash of the LED 25 is triggered and the system will use initial measurements of the effect of a given flash current on the battery to predict the maximum sustainable flash current over the whole length of the flash cycle. Since the equivalent series resistance of the battery increases with time, a programmable current drive is part of a microprocessor 5 contained within the lower housing 1. To predict the maximum sustainable flash current over the length of the flash cycle, the voltage across the battery is first measured under normal system load. Normal system load means that WIFI TX/RX or GSM (Global System for Mobile Communications), whether active or not active, must be taken into account as part of the normal system load when measuring the voltage across the battery (Vbat) at this step in the process. The flash current is lower or turned off during a radio occurrence such as GSM or WIFI. If there is a radio occurrence during the pre-flash VBAT measurement, the system repeats the measurement until the value of a VBAT level is determined in the absence of a radio occurrence. The LED flash 25 is then initiated at a pre-selected current, e.g., 500 mA. The voltage across the battery is then measured with the flash plus system load, again taking into account WIFI TX/RX or GSM, whether active or not active. The flash current at the battery is then calculated from the foregoing values and the Vf tables that are obtained from the battery vendor, and a worst-case flash driver efficiency is assumed Vf is the maximum forward voltage of the flash LED at specific currents. The Vf table is supplied by the LED vendor. Then the equivalent series resistance (ESR) across the battery is calculated from the above data. Since actual measured parameters are used for this calculation, the temperature data and age of the battery do not need to be known. Next, the equivalent series resistance of the battery is calculated at a time 500 ms later from known ESR characteristics that are provided from measurements made by the handheld electronic device vendor. A new flash current is then calculated and the result implemented within approximately less than 3 ms of the start of the flash event. The above measurements/calculations should be repeated, to verify the accuracy of the calculations. Alternatively, the system can keep sampling the battery voltage every 3 ms throughout the flash duration to ensure that the battery droop due to changes in the ESR follows the predicted path and does not reset the device.

Figure 3:
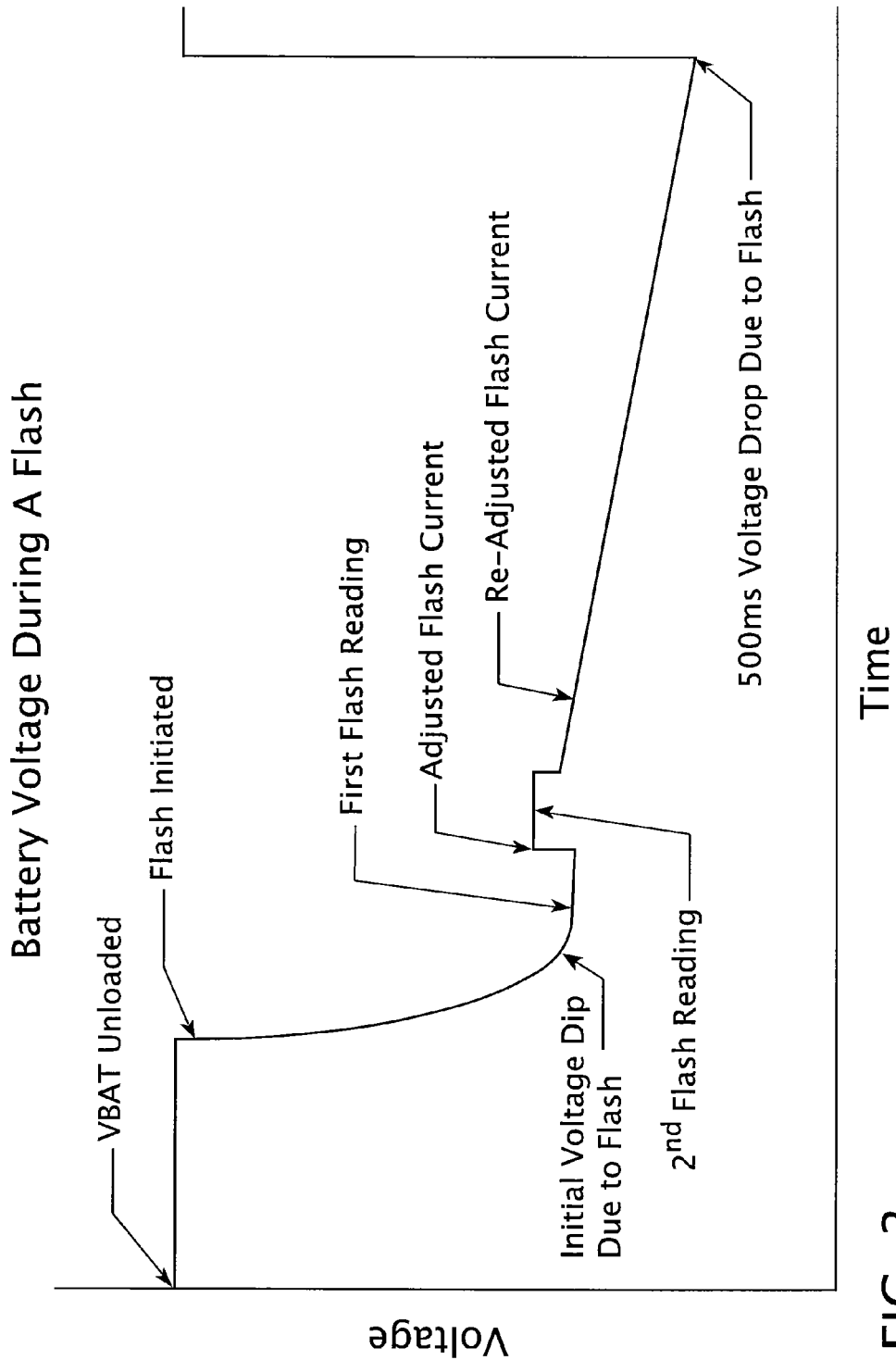
FIG. 3 is a graphical representation of the voltage droop during a 500 ms flash cycle.

The battery voltage during a flash event employing the method of the foregoing embodiment is graphically illustrated in FIG. 3 with the timing of the steps of the method of this embodiment summarily identified. It should be noted that the x and y axis in FIG. 3 are not drawn to scale.

Performing a pre-flash Vbat measurement and measuring the voltage that the battery drops down to takes into account both the temperature and battery ESR variables at the time of taking a picture with the flash. When a wireless local-area network (WLAN) is present on a device, the software that implements the steps of this embodiment needs to identify if a WLAN pulse occurred during a pre-flash measurement of Vbat. (It should be appreciated that WLAN and WIFI are used herein interchangeably.) By ORing the LNA_EN and WLAN_PA_EN, the software can determine that a WLAN was on during a flash LNA_EN and WLAN_PA are system signals that are OR-ed together and connected to a GPIO (General-Purpose Input/Output on the processor).

Figure 4:
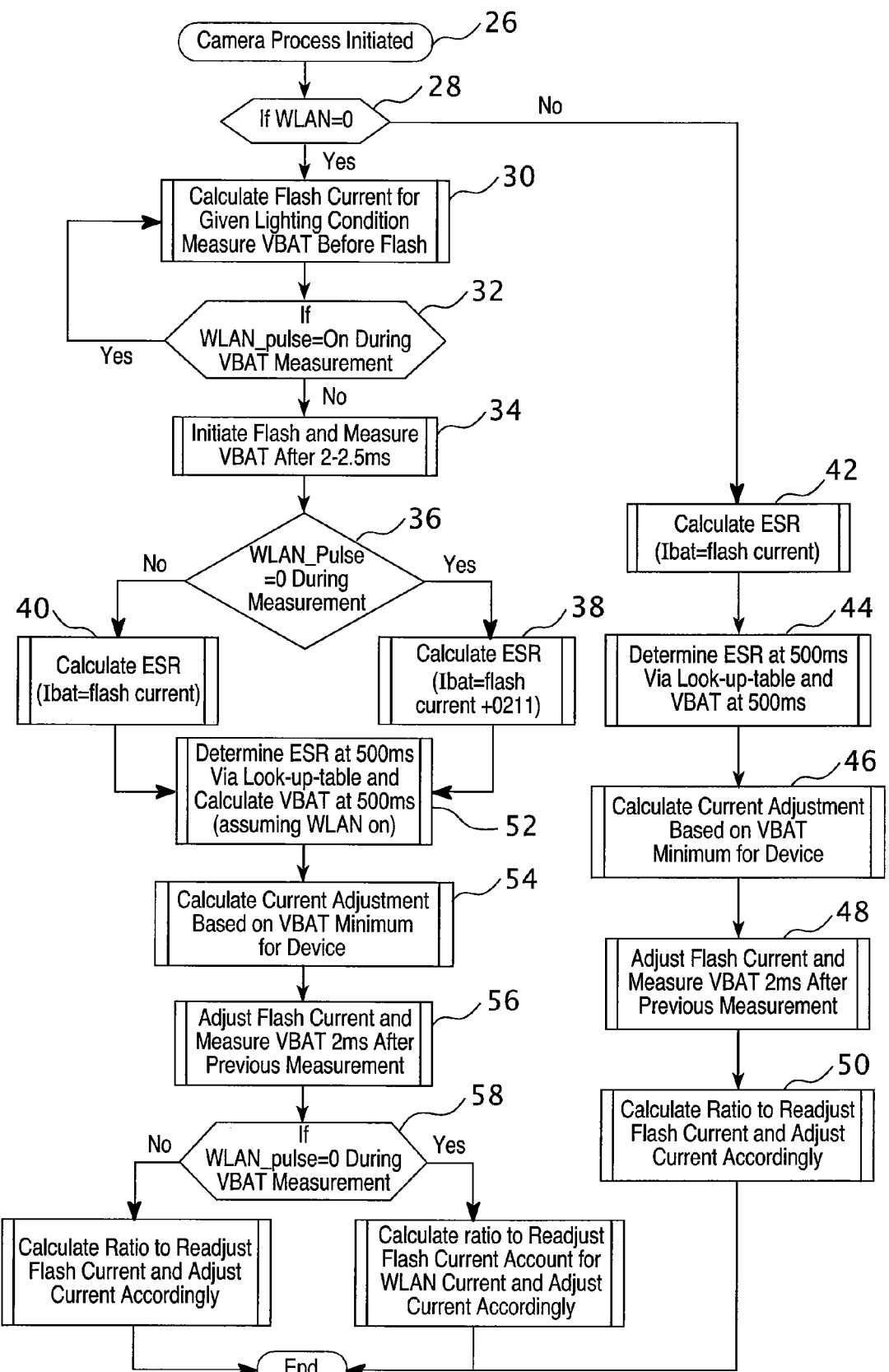
FIG. 4 is a logic flow diagram illustrating the steps of this method.

Knowing the foregoing information, the software in the microprocessor 5 that carries out the logical steps noted in FIG. 4 can reduce the camera flash current to the optimal point for a given battery and temperature to allow the system to run without hanging up the device. In general, the optimal flash current is determined by:

1. Calculating the flash current needed for a given light condition.
2. Initiating the LED flash, immediately reading the battery voltage for longer than 1 ms and taking the minimum value so read, to ignore readings that occur during a WLAN pulse, but not longer than 3 ms, and adjusting the flash current based on the calculations defined below.
3. Take a second pre-flash reading, i.e., at 4 ms into the initiation of a flash current and readjust the flash current based on the calculations defined below. The term "pre-flash" refers to the interval commencing at the time the flash current is initiated by activation of the button 9 in the operational section 11 of the cellular phone 10 and extending to a time just prior to the actual initiation of the flash of the LED 25.

The system monitors Vsys, the system voltage that provides power to the device. If Vsys is less than Vmin (a preselected setpoint) the device is automatically shut down. To avoid accidental shut downs, the system waits 3 ms after Vsys has gone below Vmin. At that point, if Vsys<Vmin is still true, the system is shut down. That is why in Step 2 above, the system needs to measure the pre-flash Vbat in less than 3 ms.

A more detailed explanation of the steps of the method of this embodiment is shown in the flow chart illustrated in FIG. 4. First, the camera process is initiated at step 26. Then, at step 28, the software identifies whether the WLAN is on. If the WLAN is on, then the software calculates the flash current for the given lighting condition and measures the Vbat before the flash at step 30. If the WLAN pulse is on during the Vbat measurement (Step 32), the Vbat measurement is repeated until it is taken at a point where no WLAN pulse occurs. If Vbat is less than or equal to 3.67V, i.e., the equivalent of one bar on the battery meter on the main display section 21, then the flash process is terminated because the battery power is too low to sustain the flash without browning out or resetting the device. The next Vbat pre-flash measurement is made at step 34. If Vbat is greater than 3.67V, then the software performs a pre-flash reading ($V_{pre-flash}$). The battery droop (Vdrop) is then calculated from the measured voltage across the battery after the flash is initiated minus $V_{pre-flash}$ ($V_{drop}$=VBAT−$V_{pre-flash}$)

In the following calculations, the $Vdrop_{predicted}$ is the predicted voltage drop for a 500 ms pulse. Vdrop is the difference in voltage between an approximately 2 ms flash current pulse and the unloaded battery voltage VBAT. $ESR_{500}$ is determined using a lookup table (LUT) from the ESR that is calculated from the Vdrop measurements. The following table provides the conversion factor for a given flash output current to convert the output flash current to the input flash current.

| Flash Current (A) | Conversion Factor |
|---|---|
| 0.150 | 1.481 |
| 0.200 | 1.520 |
| 0.300 | 1.573 |
| 0.400 | 1.614 |
| 0.500 | 1.633 |
| 0.700 | 1.688 |
| 0.900 | 1.750 |
| 1.200 | 1.850 |

The additional nomenclature used in the following equations are defined below:

$I_{adj-flash}$ is the adjusted flash current after the second pre-flash reading at 4 ms from flash initiation.

$I_{New-flash}$ is the flash current determined by the first pre-flash reading.

$V_{2nd-flash}$ is the measured VBAT during the second pre-flash reading, i.e., approximately 4 ms after the first pre-flash reading.

$V_{cal-drop}$ is the calculated expected VBAT voltage during the second pre-flash reading.

ESR is the calculated equivalent series resistance of the battery.

$ESR_{500}$ is the calculated ESR for a 500 ms flash current pulse. The equation for determining this value is determined from the battery look up table for GSM (1 ms) pulses and Flash pulses (500 ms), though it should be appreciated that the length of the pulse will depend upon the communication regime employed.

XXX_$ESR_{xx}$ is the GSM or Flash ESR value at the indicated (xx). These tables are already contained in a number of handheld electronic devices software. XXX_$ESR_{closest-10degrees}$ is the closest ESR value in the look up table but not less than the calculated ESR value at 10 degrees less.

If the WLAN is enabled as determined at step 28 and a WLAN pulse occurred during the pre-flash reading as determined by step 36 in FIG. 4, then the WLAN pulse current needs to be subtracted from the estimated flash current to calculate the ESR at Step 38, which can be determined from the following equation 1:

$$ESR = (vdrop/(I_{flash} * X_{LUT} - 0.211\,A)) + 0.068 \qquad (1)$$

The 0.211 A takes into account the worst case received WLAN current pulse. If there is no WLAN current pulse during the pre-flash reading, then the equivalent series resistance is determined at Step 40 by equation 2 below:

$$ESR=(V\text{drop}/(I_{flash}*X_{LUT}))+0.068 \quad (2)$$

If the WLAN is not enabled as determined at step 28, then the ESR is calculated at step 42-50 using equation 2 above. If the ESR, as calculated, is greater than the $GSM\_ESR_{-19}$ that is, if the calculated ESR is greater than the ESR at $-19°$ C. for a GSM pulse, then the software has to extrapolate at Step 52 the result as follows:

$$ESR_{500} = \left[\frac{FLASH\_ESR_{-19} - FLASH\_ESR_{-9}}{GSM\_ESR_{-19} - GSM\_ESR_{-9}}\right] \cdot [ESR - GSM\_ESR_{-19}] + FLASH\_ESR_{-19} \quad (3)$$

If ESR is less than GSM_ESR, that is, if the calculated ESR is less than the ESR at $51°$ C., in the presence of a GSM pulse, the calculated 500 ms ESR is then equal to the flash ESR at $51°$ C. since the slope is zero at this point on a number of the look up tables. Accordingly, under these circumstances:

$$ESR_{500}=FLASH\_ESR_{51} \quad (4)$$

Otherwise, the 500 ms ESR is interpreted from the battery lookup table by determining the GSM_ESR value closest to but less than the ESR calculated above and applying the following formula:

$$ESR_{500} = \left[\frac{FLASH\_ESR_{closest-10\,degrees} - FLASH\_ESR_{closest}}{GSM\_ESR_{closest-10\,degrees} - GSM\_ESR_{closest}}\right] \cdot [ESR - GSN\_ESR_{closest}] + FLASH\_ESR_{closest} \quad (5)$$

The calculated battery droop at 500 ms then becomes:

$$V\text{drop}_{predicted}=VBAT-ESR_{500} \cdot [I_{flash} \cdot X_{LUT}+0.356] \quad (6)$$

The optimal percent reduction in flash current obtained at Step 54 is then expressed as:

$$\% \text{ Reduction in } I_{flash} = \left[\frac{V_{pre-flash} - 3.2}{VBAT_{pre-flash} - V\text{drop}_{predicted}}\right] - 1 \quad (7)$$

If the calculated percentage reduction is greater than 100%, then the software uses a figure of 100% reduction, which means the software uses the original flash current value. If the percentage reduction is calculated to be less than zero percent, then the percentage reduction in current is zero. The new flash current then becomes:

$$I_{New-flash}=(1+\% \text{ reduction})*I_{flash}*X_{LUT} \quad (8)$$

The % reduction in equation (8) is a negative number. The second pre-flash reading ($V_{2nd-flash}$) corrects the flash current for any errors.

If a WLAN pulse occurred during the second pre-flash reading, then the WLAN transmit current needs to be added to the estimated battery droop as follows:

$$V_{cal-drop}=VBAT-ESR*(I_{New-flash}*X_{LUT}+0.356A)*1.03 \quad (9)$$

If a WLAN pulse did not occur during the second pre-flash reading, then the estimated battery droop is expressed as:

$$V_{cal-drop}=VBAT-ESR*(I_{New-flash}*X_{LUT})*1.03 \quad (10)$$

The new flash current, which was adjusted for errors, can then be expressed as:

$$I_{adj-flash}=I_{New-flash}*(V_{2nd-flash}/V_{cal-drop})*0.955 \quad (11)$$

It is important to note that the duration for the first pre-flash reading and the adjustment of the flash current must occur less than 3 ms after the camera process is initiated. If the time is longer, then there is a significant chance that the device will lock up when a flash is initiated.

While specific embodiments have been described in detail, it will be appreciated by those skilled in the art that various modifications and alternatives to those details could be developed in light of the overall teachings of the disclosure. For example, this concept can be applied to other flash technologies other than just an LED; e.g., an organic light-emitting diode (OLED). Accordingly, the particular embodiments disclosed are meant to be illustrative only and not limiting as to the scope of the device and method described herein, which is to be given the full breadth of the appended claims and any and all equivalents thereof.

What is claimed is:

1. A method for maintaining a maximum sustainable flash current over the whole length of a flash using a programmable current drive in a handheld portable device powered by a battery of a given type, that places other variable loads on the battery, in addition to the flash, comprising the steps of:
    (a) measuring the voltage across the battery under normal system load;
    (b) initiating the flash at a given current;
    (c) measuring the voltage across the battery with flash plus normal system load;
    (d) calculating the flash current at the battery;
    (e) calculating an equivalent series resistance (ESR) of the battery from the voltages measured across the battery under normal system load and under normal system load plus flash and the current calculated at the battery;
    (f) calculating a new ESR value for a pre-selected time period after step (e), within the length of the flash, based on known ESR characteristics for that type of battery;
    (g) calculating a new flash current based on the new ESR value; and
    (h) adjusting the flash current upwards or downwards to approximate the new flash current.

2. The method of claim 1 further including the step of repeating steps (c) through (h) during the length of the flash.

3. The method of claim 2 further including the step of repetitively repeating steps (c) through (h) during the length of the flash.

4. The method of claim 2 wherein steps (c) through (h) are first performed approximately 2.5 ms from the start of the flash and are repeated at approximately 4 ms from the start of the flash.

5. The method of claim 1 including repeating Step (c) at a pre-selected time from the initiation of the flash and repeating step (h) by adjusting the flash current with a ratio of the measured voltage across the battery from the repeated Step (c) and a voltage value that is a predicted battery voltage at the pre-selected time.

6. The method of claim 5 wherein the predicted battery voltage is derived from the known ESR characteristics.

7. The method of claim 1 wherein the handheld portable device has a feature that when active applies a given operating load and steps (a) and (c) take into account the given operating load whether the feature is active or not.

8. The method of claim 7 wherein the given operating load is a WIFI TX/RX load and steps (a) and (c) take into account the WIFI TX/RX load whether active or not.

9. The method of claim 1 wherein the given current is approximately 500 mA.

10. The method of claim 1 wherein the flash current is adjusted in step (h) within 3 ms of initiating the flash.

11. The method of claim 1 including the step of sampling the battery voltage at pre-selected intervals throughout the flash duration to assure that a battery droop due to ESR follows a predicted path and does not reset the device.

12. The method of claim 11 wherein the pre-selected interval is approximately every 3 ms.

13. The method of claim 1 wherein the flash is an LED flash.

14. The method of claim 1 wherein the flash is an OLED flash.

15. The method of claim 1 including the step of sampling the voltage across various points in a circuit in the handheld device to assure that operation of the handheld device is not compromised or all voltage rails remain within their operating specifications.

16. The method of claim 15 wherein the sampling step is performed at pre-selected time intervals.

17. The method of claim 16 wherein the pre-selected time intervals are approximately every 3 ms.

18. A handheld portable device powered by a battery of a given type comprising:
   a flash device;
   a programmable current drive;
   means for measuring the voltage across the battery;
   means for calculating the flash current at the battery from voltage measured across the battery under normal system load and from voltage measured across the battery under normal system load plus flash;
   means for calculating a first equivalent series resistance (ESR) of the battery from the voltages measured across the battery under normal system load and under normal system load plus flash and the current calculated at the battery;
   means for calculating a new ESR value for a pre-selected time period after the first ESR is calculated, within the length of the flash, based on known ESR characteristics for that type of battery;
   means for calculating a new flash current based on the new ESR value; and
   wherein the programmable current drive is programmed to adjust the flash current upwards or downwards to approximate the new flash current.

19. The handheld portable device of claim 18 wherein the flash device is an LED.

20. The handheld portable device of claim 18 wherein the flash device is an OLED.

* * * * *